(12) United States Patent
Longueville

(10) Patent No.: US 11,697,195 B2
(45) Date of Patent: Jul. 11, 2023

(54) TOOL FOR DRIVING A FASTENER

(71) Applicant: MILWAUKEE ELECTRIC TOOL CORPORATION, Brookfield, WI (US)

(72) Inventor: Kailyn M. Longueville, Lake Mills, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 288 days.

(21) Appl. No.: 17/109,729

(22) Filed: Dec. 2, 2020

(65) Prior Publication Data

US 2021/0170554 A1 Jun. 10, 2021

Related U.S. Application Data

(60) Provisional application No. 62/944,079, filed on Dec. 5, 2019.

(51) Int. Cl.
| | | |
|---|---|---|
| *B25B 23/00* | (2006.01) | |
| *F16H 1/20* | (2006.01) | |
| *B25B 21/00* | (2006.01) | |

(52) U.S. Cl.
CPC .......... *B25B 23/0007* (2013.01); *B25B 21/00* (2013.01); *F16H 1/203* (2013.01)

(58) Field of Classification Search
CPC ..... B25B 13/481; B25B 21/00; B25B 21/002; F16H 1/203
USPC ............................................. 81/57.29, 57.49
See application file for complete search history.

(56) References Cited

U.S. PATENT DOCUMENTS

| | | | | |
|---|---|---|---|---|
| 2,716,363 | A * | 8/1955 | Wasylow .............. | B25B 13/481 81/57.29 |
| 4,240,310 | A * | 12/1980 | Roth ....................... | B25B 17/00 81/57.3 |
| 4,813,308 | A * | 3/1989 | Petrus ................... | B25B 13/481 81/57.29 |
| 4,920,832 | A * | 5/1990 | Van Gennep ........... | B25B 17/00 81/57.29 |
| 5,168,780 | A * | 12/1992 | Van Gennep ......... | B25B 13/481 362/120 |
| 6,009,776 | A * | 1/2000 | Warren ................... | B25B 17/00 81/57.13 |
| 7,571,668 | B1 * | 8/2009 | Chang ................... | B25B 13/481 81/57.29 |
| 2012/0103142 | A1 * | 5/2012 | Sroka ..................... | B25B 17/02 81/57.3 |

(Continued)

*Primary Examiner* — David B. Thomas
(74) *Attorney, Agent, or Firm* — Michael Best & Friedrich LLP

(57) ABSTRACT

A fastener driving tool is provided for driving a fastener onto a threaded rod. The fastener driving tool includes a housing, and an input shaft rotatably supported by the housing. The input shaft defines a first rotational axis. An output member is rotatably supported by the housing. The output member is configured to rotatably support the fastener. The output member is configured to receive the fastener and a portion of the threaded rod. A transmission assembly is operatively coupled between the input shaft and the output member. The transmission assembly is configured to convert an input torque from the input shaft about the first rotational axis to an output torque about a second rotational axis acting on the output member. The second rotational axis is disposed at an angle relative to the first rotational axis.

20 Claims, 7 Drawing Sheets

(56) References Cited

U.S. PATENT DOCUMENTS

| | | | |
|---|---|---|---|
| 2014/0190315 A1* | 7/2014 | Kiser | B25B 17/00 81/57.29 |
| 2016/0031067 A1* | 2/2016 | Batt | B25B 13/08 81/57.29 |
| 2019/0247984 A1 | 8/2019 | Sawa et al. | |
| 2019/0270187 A1* | 9/2019 | Chiang | B25B 23/0028 |
| 2021/0291328 A1* | 9/2021 | Pannone | B25F 5/02 |

* cited by examiner

TOOL FOR DRIVING A FASTENER

CROSS-REFERENCE TO RELATED APPLICATIONS

This application claims priority to U.S. Provisional Patent Application No. 62/944,079, filed on Dec. 5, 2019, the entire contents of which are incorporated by reference herein.

BACKGROUND OF THE INVENTION

The present invention relates to a fastener driving tool, and more particularly to a fastener driving tool configured to rotate a fastener about a threaded rod.

Various power tools that output a torque to an output member are known in the art. Some power tools operate utilizing a rotational force (e.g., mechanical energy, etc.) to rotatably drive the output member. The power tools may be used for driving fasteners (e.g., nuts, etc.) onto a threaded rod.

SUMMARY OF THE INVENTION

In one embodiment, the invention provides a fastener driving tool for driving a fastener onto a threaded rod. The fastener driving tool includes a housing, and an input shaft rotatably supported by the housing. The input shaft defines a first rotational axis. An output member is rotatably supported by the housing. The output member is configured to rotatably support the fastener. The output member is configured to receive the fastener and a portion of the threaded rod. A transmission assembly is operatively coupled between the input shaft and the output member. The transmission assembly is configured to convert an input torque from the input shaft about the first rotational axis to an output torque about a second rotational axis acting on the output member. The second rotational axis is disposed at an angle relative to the first rotational axis.

In another embodiment, the invention provides a fastener driving tool for driving a fastener onto a threaded rod. The fastener driving tool includes a housing having a channel extending therethrough. The channel is configured to receive a first portion of the threaded rod. The fastener driving tool further includes an input shaft rotatably supported by the housing. The input shaft defines a first rotational axis. An output member is rotatably supported by the housing. The output member has a bore aligned with the channel. The output member is configured to receive the fastener. The bore of the output member is configured to receive a second portion of the threaded rod. A transmission assembly is operatively coupled between the input shaft and the output member. The transmission assembly is configured to convert an input torque from the input shaft about the first rotational axis to an output torque about a second rotational axis acting on the output member. The second rotational axis is disposed at an angle relative to the first rotational axis. Each of the bore and the channel is aligned with the second rotational axis.

In yet another embodiment, the invention provides a fastener driving tool for driving a fastener onto a threaded rod. The fastener driving tool includes a housing, and an input shaft rotatably supported by the housing. The input shaft defines a first rotational axis. An output member is rotatably supported by the housing. The output member is configured to rotatably support the fastener. The output member is configured to receive the fastener and a portion of the threaded rod. A transmission assembly is operatively coupled between the input shaft and the output member. The transmission assembly is configured to convert an input torque from the input shaft about the first rotational axis to an output torque about a second rotational axis acting on the output member. The transmission assembly includes a first bevel gear coupled to the input shaft, a second bevel gear, and an intermediate bevel gear intermeshed with the first bevel gear and the second bevel gear. The first bevel gear is configured to rotate about the first rotational axis, and the second bevel gear is configured to rotate about the second rotational axis. The second bevel gear is coupled to the output member. The second rotational axis is disposed at an angle relative to the first rotational axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 3:
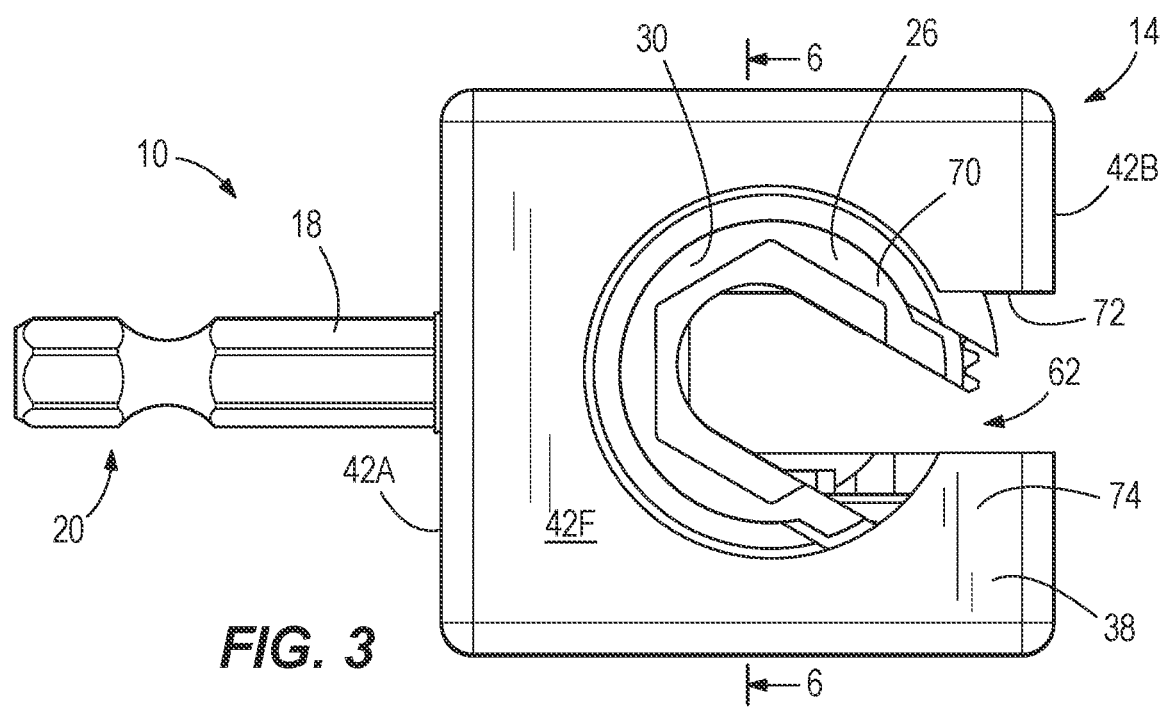
FIG. 3 is a top view of the fastener driving tool of FIG. 1.
Figure 4:
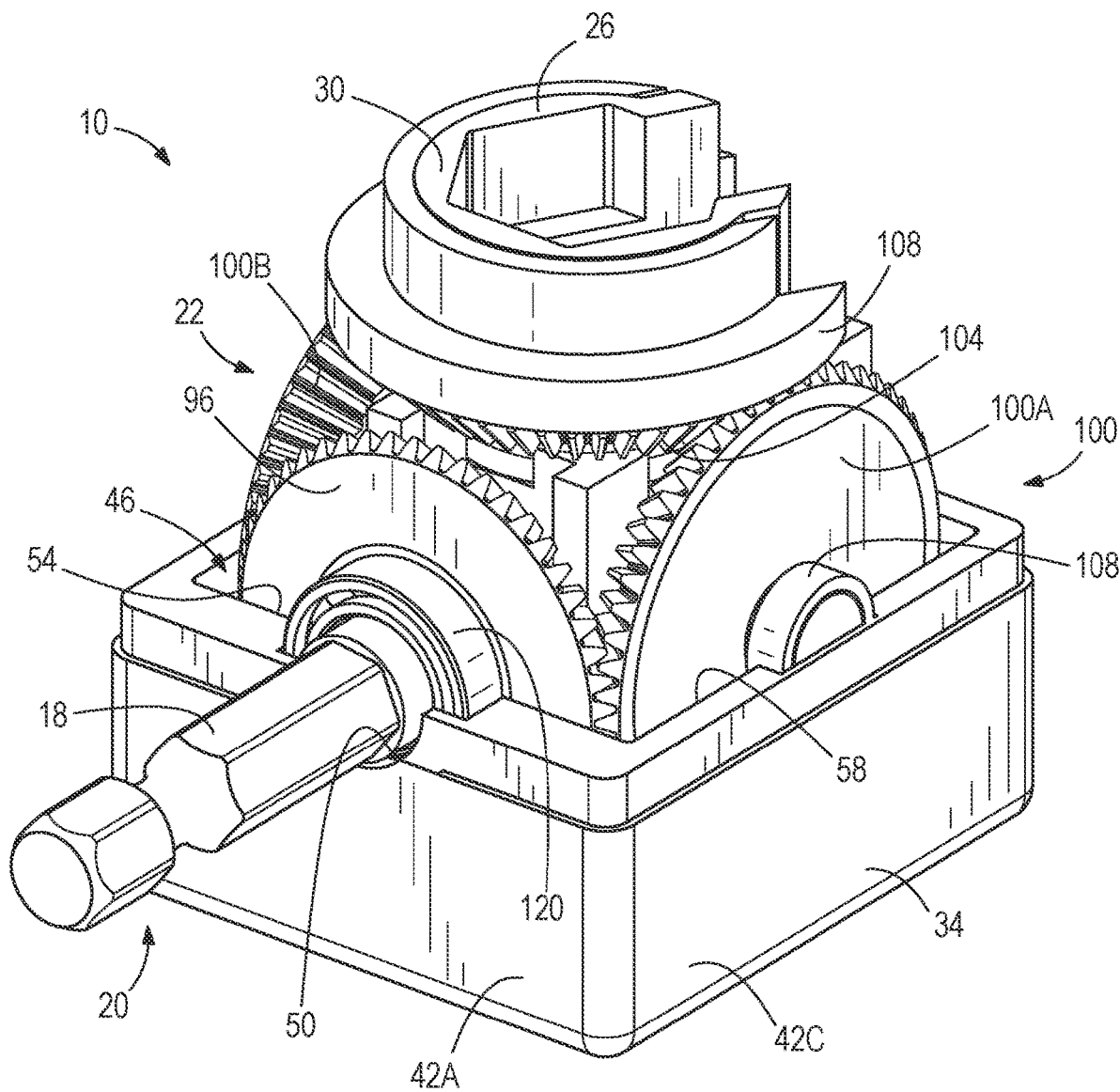
FIG. 4 is another perspective view of the fastener driving tool of FIG. 1, with one of the housing portions of FIG. 1 removed.
Figure 5:
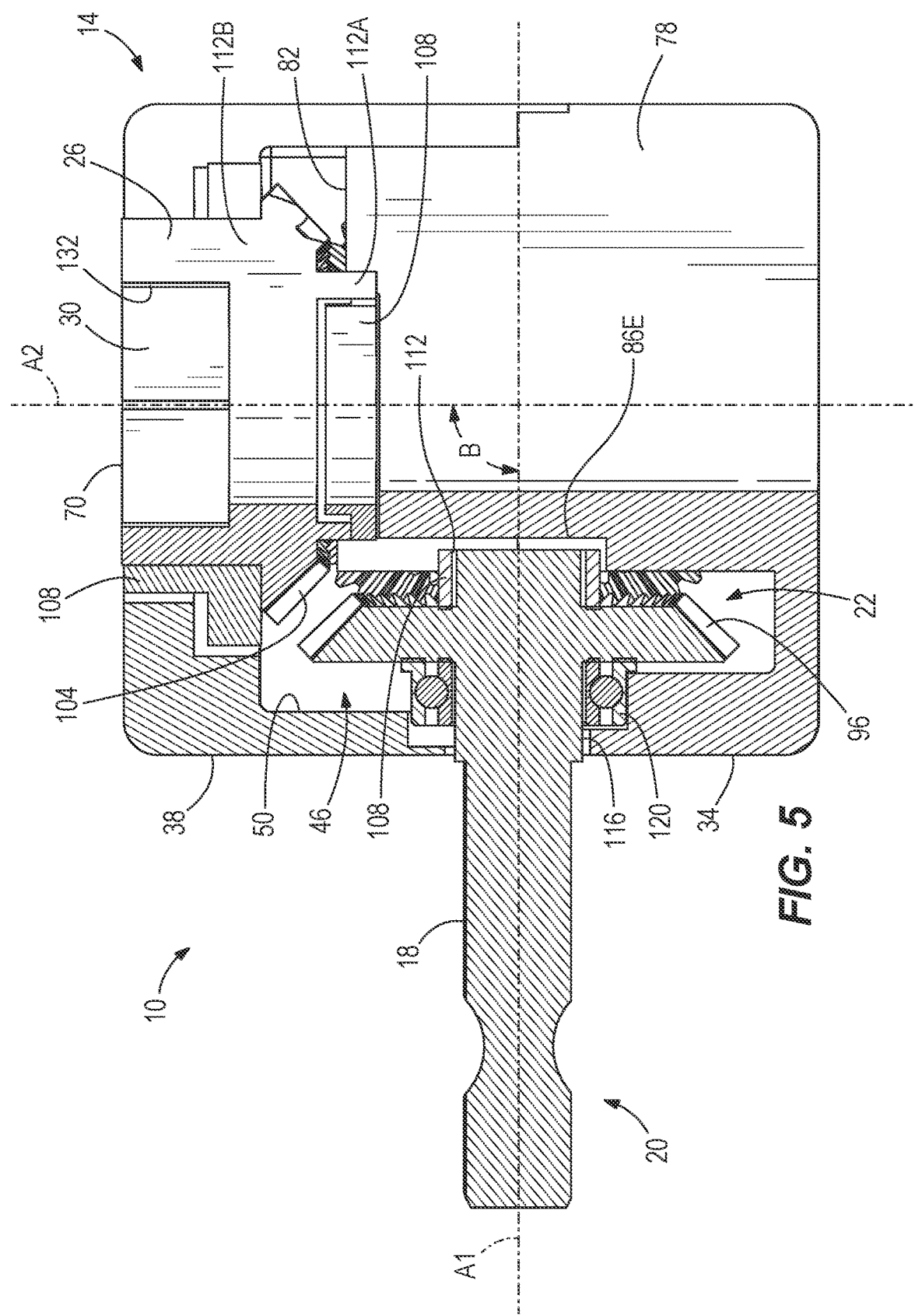
FIG. 5 is a cross-sectional view of the fastener driving tool of FIG. 1 taken along lines 5-5 in FIG. 1.

FIGS. 1-9 illustrate a fastener driving tool 10, or portions thereof. The driving tool 10 includes a housing assembly 14 supporting an input shaft 18, a transmission assembly 22 (FIG. 4), and an output member 26. The transmission assembly 22 is operatively coupled between the input shaft 18 and the output member 26. As shown in FIG. 5, the transmission assembly 22 converts input torque about a first rotational axis A1 to an output torque acting on the output member 26 to drive the output member 26 to rotate along a second rotational axis A2. The second rotational axis A2 is disposed at an angle B relative to the first rotational axis A1. The angle B is a non-parallel angle. In some embodiments, the angle B may be greater than 30 degrees. In other embodiments, the angle B may be about 80-100 degrees. In the illustrated embodiment, the angle B is 90 degrees. In other words, the illustrated second rotational axis A2 is perpendicular to the first rotational axis A1. The output member 26 includes a drive socket 30 configured to receive a fastener (e.g., hex nut) for driving of the fastener by the driving tool 10.

With reference to FIG. 5, the input shaft 18 defines the first rotational axis A1. The input shaft 18 (i.e., a tool coupling portion 20) is coupable to a power tool, such as a drill. The input shaft 18 is driven to rotate about the first rotational axis A1 by a torque applied by the power tool.

Figure 1:
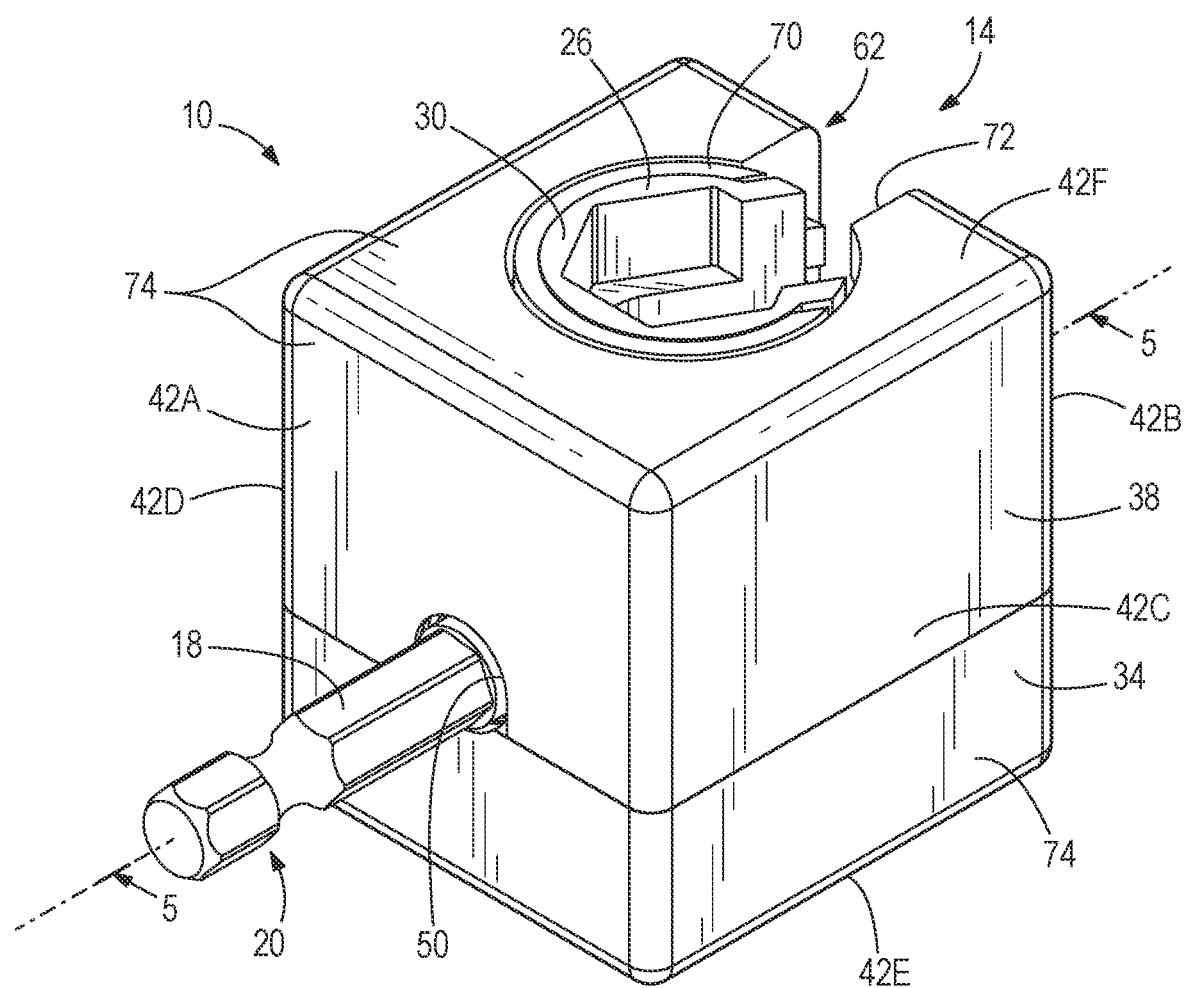
FIG. 1 is a perspective view of a fastener driving tool embodying the invention, the fastener driving tool including a first housing portion and a second housing portion.

FIG. 1 illustrates the housing assembly 14 including a plurality of housing portions 34, 38. In the illustrated embodiment, the housing assembly 14 includes a first housing portion 34 and a second housing portion 38 coupled to the first housing portion 34. The plurality of housing portions 34, 38 define a plurality of sides 42A-42F of the housing assembly 14. In the illustrated embodiment, the housing assembly 14 includes a first side 42A, a second side 42B, and third and fourth sides 42C, 42D extending between the first and second sides 42A, 42B. In addition, the housing assembly 14 includes bottom and top sides 42E, 42F extending between the first and second sides 42A, 42B, and the third and fourth sides 42C, 42D to form a rectangular or box-like shape.

With reference to FIGS. 4-5, the first and second housing portions 34, 38 define a cavity 46 therewithin. The illustrated cavity 46 has a U-shape having a middle portion 54 and two leg portions 58. The housing assembly 14 further includes an aperture 50 in connection with the cavity 46. The illustrated aperture 50 is defined by the first and second housing portions 34, 38. The aperture 50 is positioned on the first side 42A of the housing assembly 14. The input shaft 18 extends through the aperture 50 into the cavity 46.

Figure 2:
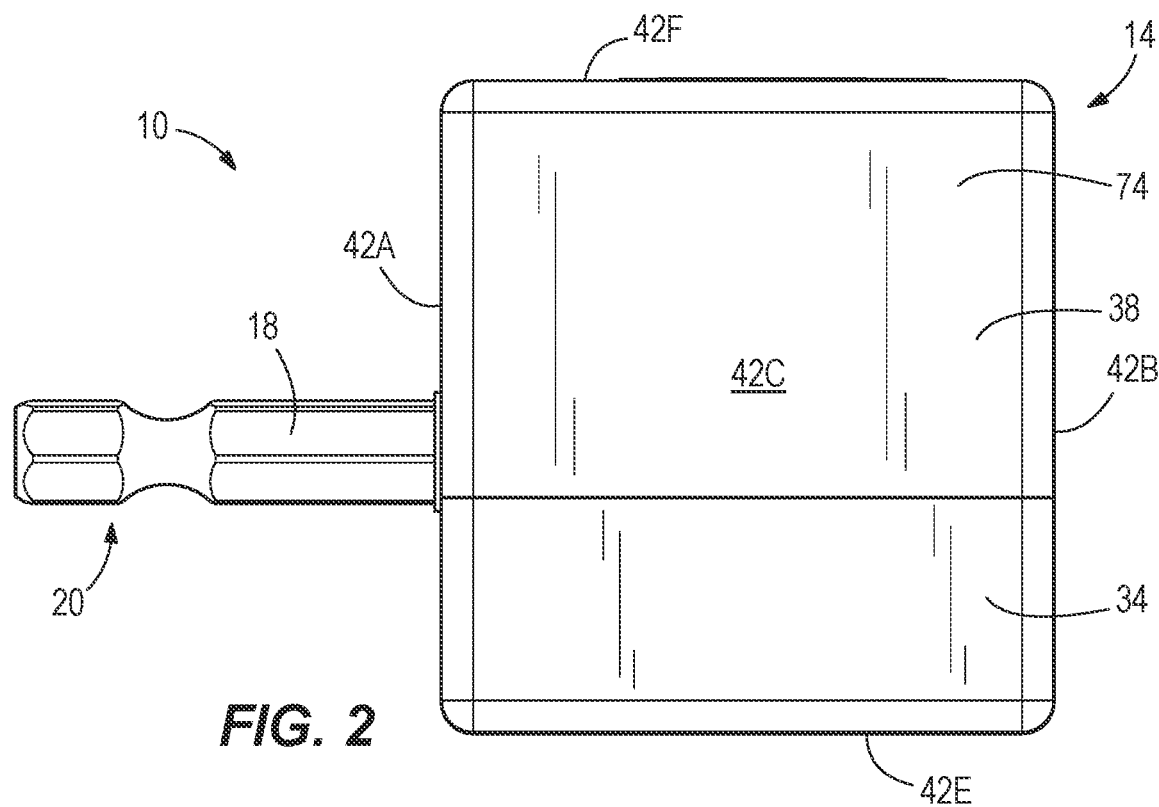
FIG. 2 is a side view of the fastener driving tool of FIG. 1.

With reference to FIGS. 1-3, the housing assembly 14 includes a channel 62 extending therethrough from the bottom side 42E to the top side 42F of the housing assembly 14. The channel 62 extends between a first end 66 positioned on the bottom side 42E, and a second end 70 positioned on the top side 42F. The channel 62 defines the second rotational axis A2 extending through the first and second ends 66, 70. One of the leg portions 58 is spaced from the other leg portion 58 to define the channel 62. In addition, the channel 62 is in connection with an opening 72 positioned on the second side 42B of the housing assembly 14 opposite the first side 42A having the aperture 50. Furthermore, the output member 26 partially defines the channel 62 proximate the second end 70, as further discussed below. The second end 70 is configured as the output end of the driving tool 10.

Figure 6:
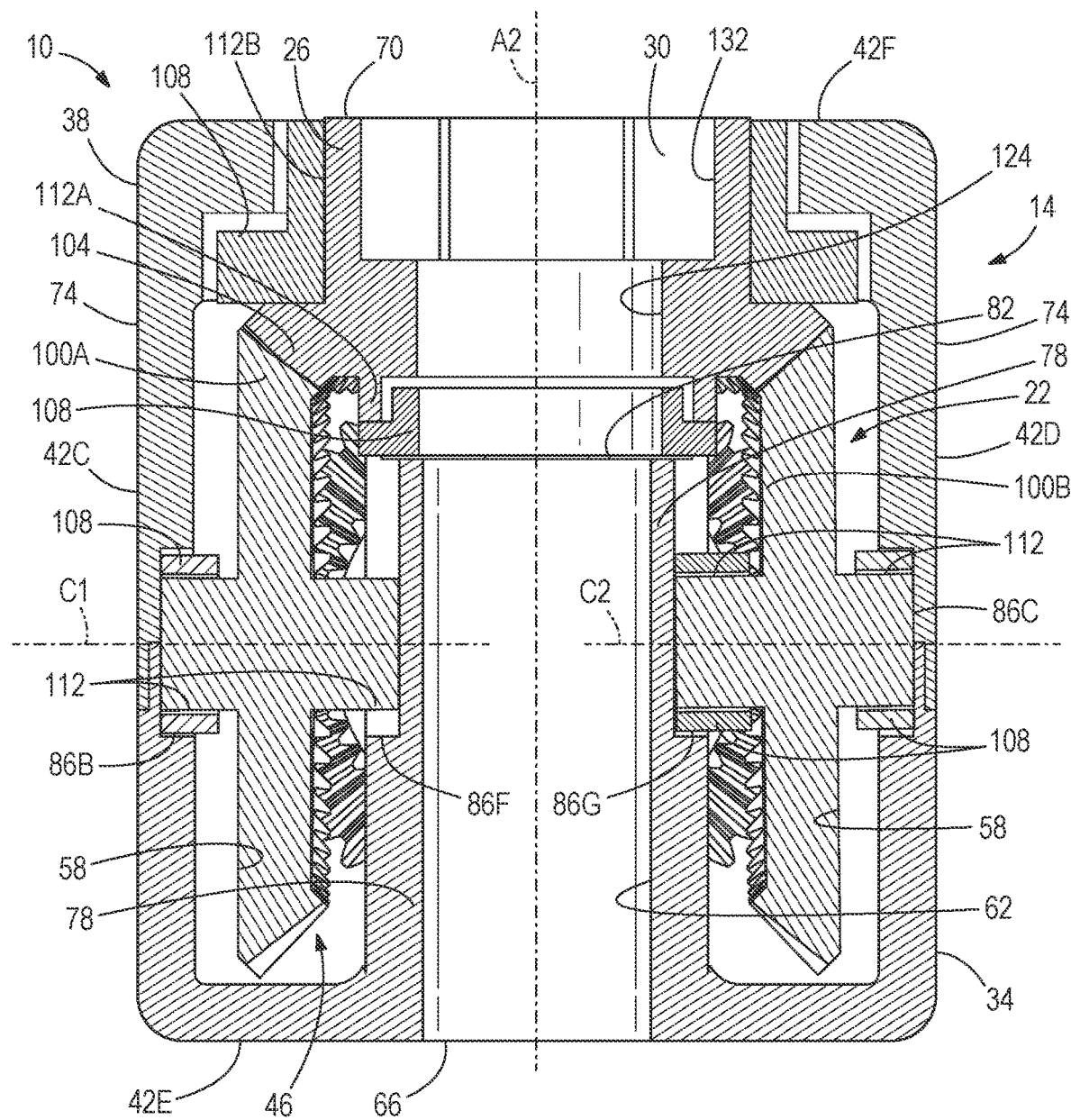
FIG. 6 is another cross-sectional view of the fastener driving tool of FIG. 1 taken along lines 6-6 in FIG. 3.
Figure 8:
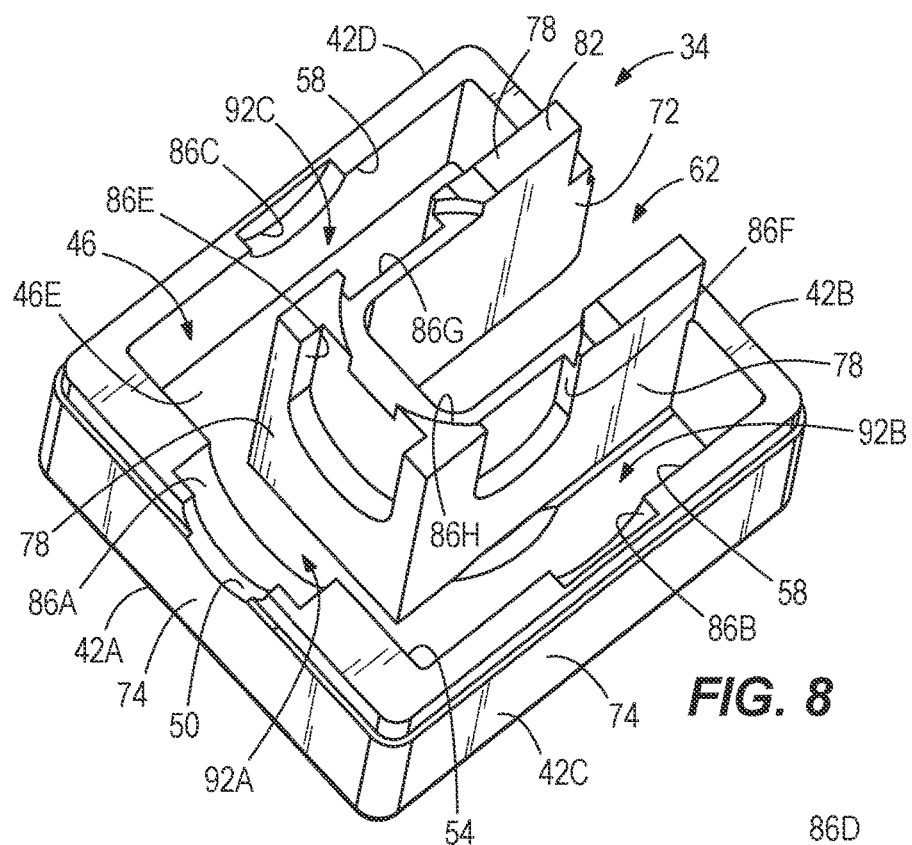
FIG. 8 is a top perspective view of the first housing portion of the fastener driving tool of FIG. 1.
Figure 9:
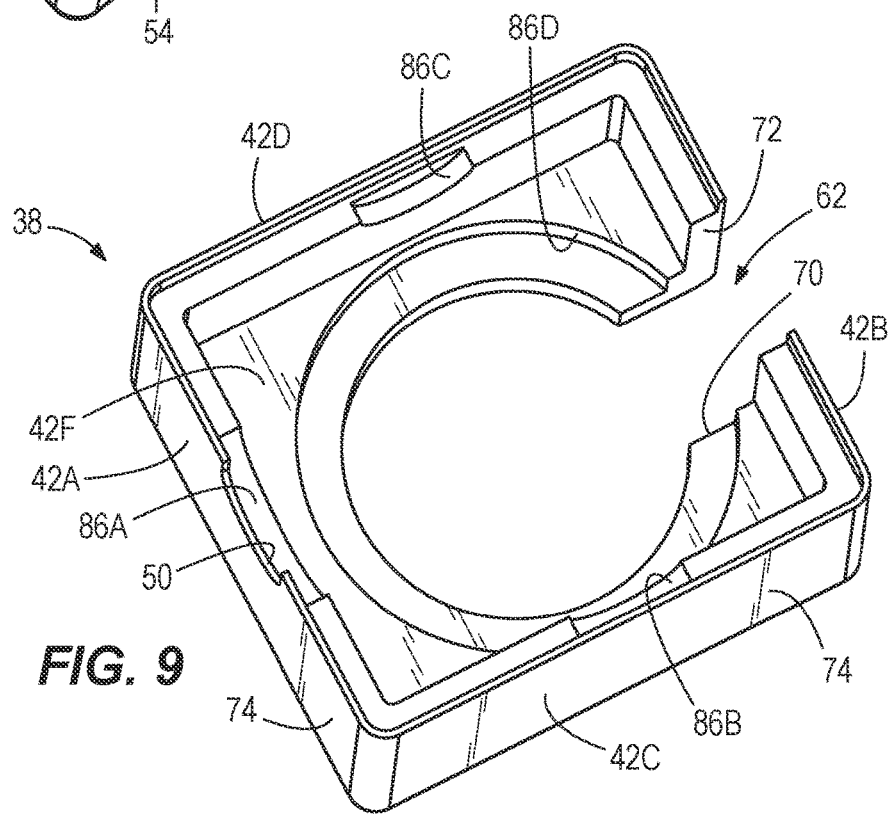
FIG. 9 is a bottom perspective view of the second housing portion of the fastener driving tool of FIG. 1.

With reference to FIGS. 8-9, the first and second housing portions 34, 38 include a plurality of outer wall members 74 forming the plurality of sides 42A-42F. In addition, the first housing portion 34 includes a plurality of inner wall members 78. The outer and inner wall members 74, 78 define the cavity 46. Further, the inner wall members 78 at least partially define the channel 62. In the illustrated embodiment, the housing assembly 14 includes three inner wall members 78 (FIG. 8) to define the channel 62. The inner wall members 78 extend from the bottom side 42E toward the top side 42F of the housing assembly 14. As shown in FIG. 6, the output member 26 is positioned between an end 82 of the inner wall members 78 and the top side 42F of the housing assembly 14.

Each of the outer and inner wall members 74, 78 define a plurality of support notches 86A-86H within the cavity 46. In the illustrated embodiment, the first side 42A includes the support notch 86A defined by an inner surface of the outer wall member 74 and aligned with the aperture 50. In addition, each of the third side 42C and the fourth side 42D includes the support notch 86B, 86C, respectively, defined by an inner surface of the respective outer wall member 74. The top side 42F of the housing assembly 14 further includes the support notch 86D (FIG. 9) defined by an inner surface of the outer wall member 74 (i.e., of the second housing portion 38).

Each of the support notches 86A-86C on the first, third, and fourth sides 42A, 42C, 42D are defined by both the first housing portion 34 and the second housing portion 38. In other words, a portion of the support notch 86A-86C on each of the first, third, and fourth sides 42A, 42C, 42D is defined by the first housing portion 34, and another portion of the respective support notch 86A-86C is defined by the second housing portion 38.

FIG. 8 illustrates each of the inner wall members 78 including the support notch 86E-86G defined by an inner surface of the respective inner wall member 78. In addition, the end 82 of each of the inner wall members 78 cooperatively define another support notch 86H. Each support notch 86E-86H of the inner wall members 78 is in facing relationship with the support notch 86A-86D of the respective outer wall member 74. Accordingly, in the illustrated embodiment, there are four pairs of support notches 92A-92D defined by the outer and inner wall members 74, 78.

Figure 7:
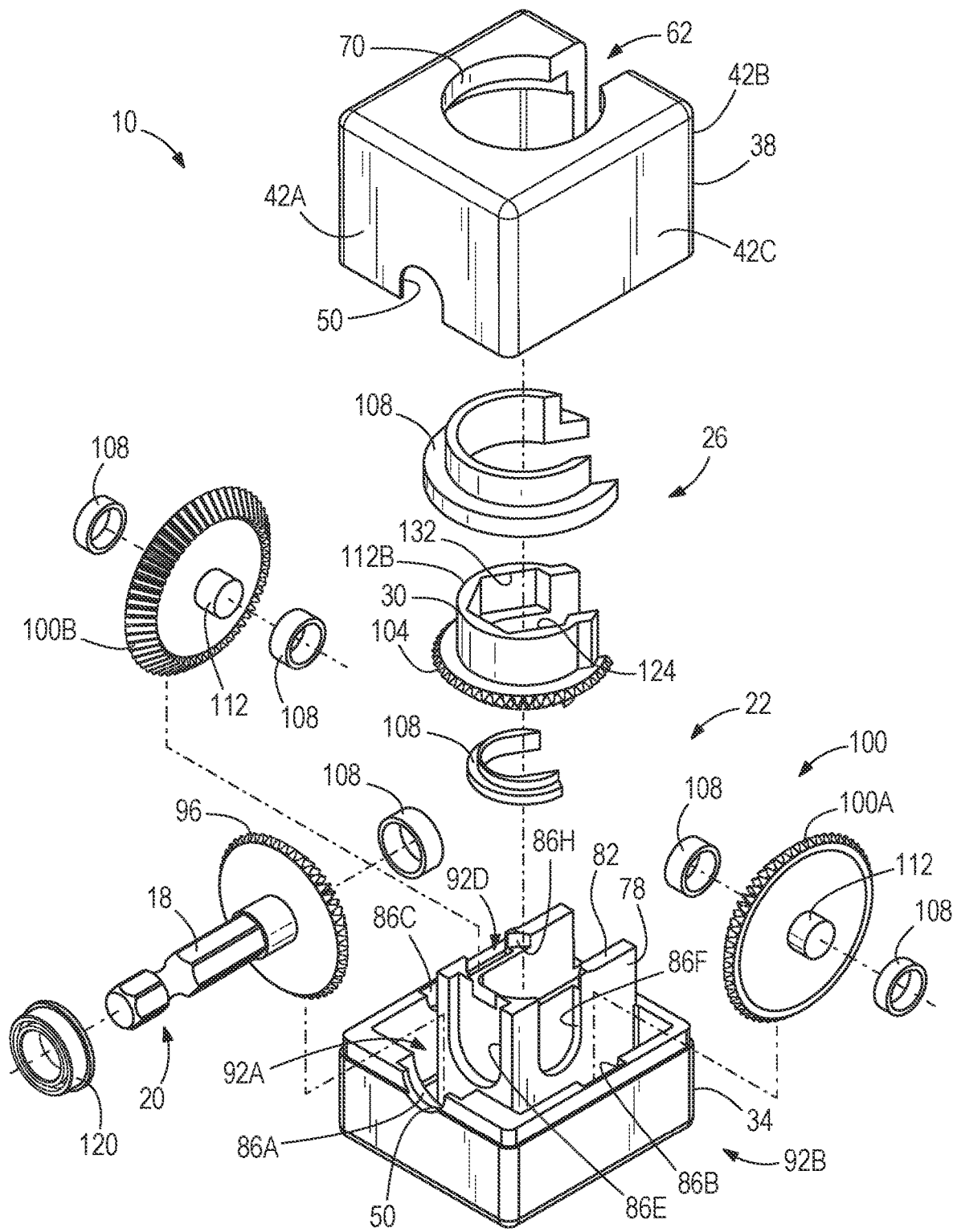
FIG. 7 is an exploded view of the fastener driving tool of FIG. 1.

For example, the support notch 86A on the first side 42A of the housing assembly 14 is in facing relationship with one of the support notches 86E on one of the inner wall members 78. This pair of support notches may be termed as the "input pair" of support notches 92A. In another example, the support notch 86D on the top side 42F of the housing assembly 14 is in facing relationship with the support notch 86H cooperatively defined by the end 82 of the inner wall members 78. This pair of support notches may be termed as the "output pair" of support notches 92D (FIG. 7). Still further, in another example as shown in FIG. 8, the support notch 86B, 86C on the third or fourth side 42C, 42D, respectively, is in facing relationship with one of the remaining two support notches 86F, 86G on the inner wall members 78 that form the leg portions 58 of the cavity 46. These two pairs of support notches may be termed as the "first and second intermediate pairs" of support notches 92B, 92C, respectively. In the illustrated embodiment, each support notch 86 includes a curved surface.

With reference to FIG. 7, the transmission assembly 22 includes a first bevel gear 96, an intermediate bevel gear assembly 100, and a second bevel gear 104. The transmission assembly 22 is received in the cavity 46. The transmission assembly 22 further includes a plurality of bushings 108 for rotatably supporting the bevel gears 96, 100, 104 within the housing assembly 14. More specifically, each bevel gear 96, 100, 104 includes a plurality of extension members 112 extending therefrom. One of the bushings 108 is positioned on each extension member 112. When assembled, the extension members 112 and bushings 108 are received in the respective support notches 86B-86H of the housing assembly 14.

With reference of FIG. 5, the first bevel gear 96 is coupled for co-rotation with the input shaft 18. In the illustrated embodiment, the first bevel gear 96 is integral with an end of the input shaft 18. In other embodiments, the first bevel gear 96 may be welded or otherwise secured to the input shaft 18. Accordingly, the first bevel gear 96 rotates with the rotation of the input shaft 18. The first bevel gear 96 is positioned in the middle portion 54 of the cavity 46. The first bevel gear 96 includes a plurality of teeth.

The first bevel gear 96 includes the extension member 112 positioned on a side opposite the input shaft 18. The extension member 112 is configured to support one of the bushings 108. The extension member 112 is received in one of the support notches 86E of the input pair of support notches 92A. More specifically, the extension member 112 is received in the support notch 86E on the inner wall member 78. Furthermore, the input shaft 18 includes a support portion 116 adjacent the first bevel gear 96, opposite the extension member 112. The support portion 116 is configured to support a bearing 120 (e.g., ball bearing). More specifically, the bearing 120 (and support portion 116) is received in the other support notch 86A of the input pair of support notches 92A positioned on the outer wall member 74.

With reference to FIG. 6, the intermediate bevel gear assembly 100 includes two bevel gears 100A, 100B, one positioned in each leg portion 58 of the cavity 46. In some embodiments, the intermediate bevel gear assembly 100 may only include a single bevel gear, three bevel gears, etc. Each bevel gear 100A, 100B includes a plurality of teeth. Each bevel gear 100A, 100B is intermeshed with the first bevel gear 96 and the second bevel gear 104.

Each bevel gear 100A, 100B of the intermediate bevel gear assembly 100 includes two extension members 112. Each extension member 112 extends from opposite sides of the respective bevel gear 100A, 100B. Each extension member 112 is configured to support one of the bushings 108. The extension members 112 of the intermediate bevel gear assembly 100 are received in the first and second intermediate pairs of support notches 92B, 92C. The extension members 112 of each bevel gear 100A, 100B define an intermediate rotational axis C1, C2, respectively, of the respective bevel gear 100A, 100B of the intermediate bevel gear assembly 100.

With reference to FIGS. 5-6, the second bevel gear 104 is positioned proximate the top side 42F of the housing assembly 14. The second bevel gear 104 includes a bore 124 (FIG. 6) aligned with the second rotational axis A2 of the channel 62. As such, the second bevel gear 104 forms a portion of the channel 62. The second bevel gear 104 includes a plurality of teeth.

The second bevel gear 104 further includes two extension members 112A, 112B extending therefrom on opposite sides of the second bevel gear 104. The bore 124 extends through each extension member 112A, 112B. Each extension member 112A, 112B is configured to support one of the bushings 108. The extension members 112A, 112B are received in the output pair of support notches 92D. More specifically, the first extension member 112A is received in the support notch 86H cooperatively defined by the end 82 of the inner wall members 78.

The second extension member 112B has a cylindrical shape and is received in the support notch 86D defined by the outer wall member 74 on the top side 42F. Furthermore, the second extension member 112B defines a hexagonally shaped cut-out 132. The cut-out 132 is aligned with the second rotational axis A2. The cut-out 132 is configured as the drive socket 30 configured to receive the fastener (e.g., hex nut). As such, the second bevel gear 104, the first extension member 112A, and the second extension member 112B are rotatably coupled together. In other embodiments, the second bevel gear 104 and the drive socket 30 are formed separate and coupled together for co-rotation. Accordingly, the output member 26 may include one or more of the second bevel gear 104, the first extension member 112A, and/or the drive socket 30 (i.e., the second extension member 112B).

When assembled, the first bevel gear 96 is intermeshed with the intermediate bevel gear assembly 100, and the intermediate bevel gear assembly 100 is intermeshed with the second bevel gear 104. Accordingly, rotation of the input shaft 18 is configured to drive rotation of the second bevel gear 104 including the drive socket 30. The channel 62 is configured to receive a threaded shaft or rod (not shown) such that rotation of the drive socket 30 drives the fastener (e.g., hex nut) onto the threaded rod.

In some embodiments of the driving tool 10 (e.g., embodiments including only one intermediate bevel gear, three intermediate bevel gears, etc.), the driving tool 10 may be further provided with additional gears. The additional gears may be positioned within the housing assembly 14, and proximate the opening 72. The additional gears may be movable (e.g., pivotable) relative to the opening 72 to selectively cover and uncover the opening 72 such that the second bevel gear 104 continues rotation with the rotation of the intermediate bevel gear assembly 100.

In operation, the threaded rod is positioned within the channel 62. A torque is applied by the power tool to the input shaft 18 to drive rotation of the input shaft 18. The rotation of the input shaft 18 drives rotation of the first bevel gear 96 about the first rotational axis A1. Concurrently, the intermediate bevel gear assembly 100 is driven to rotate (about the intermediate rotational axes C) via engagement between the teeth of the first bevel gear 96 and the teeth of the intermediate bevel gear assembly 100. Furthermore, the second bevel gear 104 is driven to rotate about the second rotational axis A2 via engagement between the teeth of the intermediate bevel gear assembly 100 and the teeth of the second bevel gear 104. The fastener is positioned about a portion of the threaded rod and in the drive socket 30 (i.e., the cut-out 132) of the second bevel gear 104 for rotation with the second bevel gear 104. Accordingly, the drive tool 10 converts the torque applied to the input shaft 18 to generate rotation of the input shaft 18 about the first rotational axis A1 to rotation of the drive socket 30 about the second rotational axis A2.

Advantageously, the channel 62 extends through the housing assembly 14 such that threaded rods of any predetermined length may be received in the channel 62. In particular, the driving tool 10 is adapted for driving fasteners on threaded rods having a relatively large length (e.g., 18 inches or greater). In addition, the channel 62 is in connection with the open second side 42B of the housing assembly 14 such that a user has access to the fastener in the drive socket 30 and/or the threaded rod in the channel 62. Furthermore, the support notches 86A-86H facilitate positioning of the bevel gears 96, 100, 104 at select locations within the housing assembly 14.

Thus, the invention provides, among other things, a fastener driving tool configured to convert torque about a first rotational axis to drive rotation of a drive socket about a second rotational axis that is at an angle relative to the first rotational axis. The fastener driving tool may be used for threaded rods having different lengths. Various features and advantages of the invention are set forth in the following claims.

What is claimed is:

1. A fastener driving tool for driving a fastener onto a threaded rod, the fastener driving tool comprising:
   a housing;
   an input shaft rotatably supported by the housing, the input shaft defining a first rotational axis;
   an output member rotatably supported by the housing, the output member configured to rotatably support the fastener, the output member configured to receive the fastener and a portion of the threaded rod; and a transmission assembly operatively coupled between the input shaft and the output member, the transmission assembly configured to convert an input torque from the input shaft about the first rotational axis to an output torque about a second rotational axis acting on the output member, wherein the second rotational axis is disposed at an angle relative to the first rotational axis, and wherein the housing includes a plurality of outer housing members and a plurality of inner housing members to define a cavity therebetween, wherein the cavity receives the transmission assembly, and wherein the plurality of inner housing members define a channel extending through the housing, the channel separated from the cavity by the plurality of inner housing members.

2. The fastener driving tool of claim 1, wherein the angle is 90 degrees.

3. The fastener driving tool of claim 1, wherein the housing includes a channel extending therethrough, the channel extending colinear with the second rotational axis, and wherein the channel is configured to receive another portion of the threaded rod.

4. The fastener driving tool of claim 1, wherein the output member includes a bevel gear having a bore extending colinear with the second rotational axis, the bore configured to receive the portion of the threaded rod.

5. The fastener driving tool of claim 1, wherein the output member includes a bevel gear and an extension portion extending therefrom, and wherein the extension portion defines a drive socket configured to receive the fastener.

6. The fastener driving tool of claim 1, wherein the output member is positioned within the cavity, wherein the output member is positioned between an end of the plurality of inner housing members and one of the plurality of outer housing members, and wherein the output member includes a bore aligned with the channel.

7. The fastener driving tool of claim 1, wherein the transmission assembly includes a first bevel gear coupled to the input shaft, a second bevel gear, and an intermediate bevel gear intermeshed with the first bevel gear and the second bevel gear, and wherein the first bevel gear is configured to rotate about the first rotational axis, and the second bevel gear is configured to rotate about the second rotational axis.

8. The fastener driving tool of claim 7, wherein the housing includes a plurality of sides, wherein the first bevel gear is positioned adjacent a first side of the plurality of sides, the second bevel gear is positioned adjacent a second side of the plurality of sides, and the intermediate bevel gear is positioned adjacent a third side of the plurality of sides.

9. The fastener driving tool of claim 1, wherein the transmission assembly includes two intermediate bevel gears, each intermediate bevel gear intermeshed with a first bevel gear of the input shaft and a second bevel gear of the output member, and wherein the two intermediate bevel gears are spaced apart within the housing.

10. A fastener driving tool for driving a fastener onto a threaded rod, the fastener driving tool comprising:
a housing having a channel extending therethrough, the channel configured to receive a first portion of the threaded rod;
an input shaft rotatably supported by the housing, the input shaft defining a first rotational axis;
an output member rotatably supported by the housing, the output member having a bore aligned with the channel, the output member configured to receive the fastener, and the bore of the output member configured to receive a second portion of the threaded rod; and
a transmission assembly operatively coupled between the input shaft and the output member, the transmission assembly configured to convert an input torque from the input shaft about the first rotational axis to an output torque about a second rotational axis acting on the output member, wherein the second rotational axis is disposed at an angle relative to the first rotational axis, wherein each of the bore and the channel is aligned with the second rotational axis, and wherein the output member includes a bevel gear and an extension portion extending therefrom, wherein the bore extends through the bevel gear and the extension portion, and wherein the extension portion defines a drive socket configured to receive the fastener.

11. The fastener driving tool of claim 10, wherein the housing includes a plurality of outer housing members and a plurality of inner housing members to define a cavity therebetween, wherein the cavity receives the transmission assembly, wherein the plurality of inner housing members define the channel, and wherein the channel is separated from the cavity by the plurality of inner housing members.

12. The fastener driving tool of claim 10, wherein the bevel gear of the output member is a second bevel gear, wherein the transmission assembly includes a first bevel gear coupled to the input shaft and an intermediate bevel gear intermeshed with the first bevel gear and the second bevel gear, and wherein the first bevel gear is configured to rotate about the first rotational axis, and the second bevel gear is configured to rotate about the second rotational axis.

13. The fastener driving tool of claim 10, wherein the bevel gear of the output member is a second bevel gear, wherein the transmission assembly includes two intermediate bevel gears intermeshed with a first bevel gear of the input shaft and the second bevel gear of the output member, and wherein the two intermediate bevel gears are spaced apart within the housing.

14. A fastener driving tool for driving a fastener onto a threaded rod, the fastener driving tool comprising:
a housing;
an input shaft rotatably supported by the housing, the input shaft defining a first rotational axis;
an output member rotatably supported by the housing, the output member configured to rotatably support the fastener, the output member configured to receive the fastener and a portion of the threaded rod; and
a transmission assembly operatively coupled between the input shaft and the output member, the transmission assembly configured to convert an input torque from the input shaft about the first rotational axis to an output torque about a second rotational axis acting on the output member, the transmission assembly including a first bevel gear coupled to the input shaft,
a second bevel gear, and an intermediate bevel gear intermeshed with the first bevel gear and the second bevel gear,
wherein the first bevel gear is configured to rotate about the first rotational axis, and the second bevel gear is configured to rotate about the second rotational axis,
wherein the second bevel gear is coupled to the output member, and
wherein the second rotational axis is disposed at an angle relative to the first rotational axis.

15. The fastener driving tool of claim 14, wherein the housing includes a channel extending therethrough, the channel extending colinear with the second rotational axis, and wherein the channel is configured to receive another portion of the threaded rod.

16. The fastener driving tool of claim 14, wherein the second bevel gear includes a bore extending colinear with the second rotational axis, and wherein the bore is configured to receive the portion of the threaded rod.

17. The fastener driving tool of claim 14, wherein the second bevel gear includes an extension portion extending therefrom, and wherein the extension portion defines a drive socket configured to receive the fastener.

18. The fastener driving tool of claim 14, wherein the intermediate bevel gear is a first intermediate bevel gear, and wherein the transmission assembly further includes a second intermediate bevel gear intermeshed with the first bevel gear and the second bevel gear, the first intermediate bevel gear and the second intermediate bevel gear spaced apart within the housing.

19. A fastener driving tool for driving a fastener onto a threaded rod, the fastener driving tool comprising:
   a housing;
   an input shaft rotatably supported by the housing, the input shaft defining a first rotational axis;
   an output member rotatably supported by the housing, the output member configured to rotatably support the fastener, the output member configured to receive the fastener and a portion of the threaded rod; and
   a transmission assembly operatively coupled between the input shaft and the output member, the transmission assembly configured to convert an input torque from the input shaft about the first rotational axis to an output torque about a second rotational axis acting on the output member,
   wherein the second rotational axis is disposed at an angle relative to the first rotational axis,
   wherein the transmission assembly includes a first bevel gear coupled to the input shaft, a second bevel gear, and an intermediate bevel gear intermeshed with the first bevel gear and the second bevel gear, and wherein the first bevel gear is configured to rotate about the first rotational axis, and the second bevel gear is configured to rotate about the second rotational axis, and
   wherein the housing includes a plurality of sides, wherein the first bevel gear is positioned adjacent a first side of the plurality of sides, the second bevel gear is positioned adjacent a second side of the plurality of sides, and the intermediate bevel gear is positioned adjacent a third side of the plurality of sides.

20. A fastener driving tool for driving a fastener onto a threaded rod, the fastener driving tool comprising:
   a housing;
   an input shaft rotatably supported by the housing, the input shaft defining a first rotational axis;
   an output member rotatably supported by the housing, the output member configured to rotatably support the fastener, the output member configured to receive the fastener and a portion of the threaded rod; and
   a transmission assembly operatively coupled between the input shaft and the output member, the transmission assembly configured to convert an input torque from the input shaft about the first rotational axis to an output torque about a second rotational axis acting on the output member,
   wherein the second rotational axis is disposed at an angle relative to the first rotational axis, and
   wherein the transmission assembly includes two intermediate bevel gears, each intermediate bevel gear intermeshed with a first bevel gear of the input shaft and a second bevel gear of the output member, and wherein the two intermediate bevel gears are spaced apart within the housing.

\* \* \* \* \*